BELTING

Original Filed July 14, 1961 2 Sheets-Sheet 1

Inventor
Peter Michael Robinson
By Stevens Davis Miller & Mosher
Attorneys

BELTING

Original Filed July 14, 1961 2 Sheets-Sheet 2

Inventor

Peter Mickael Robinson

By Stevens Davis Miller & Mosher

Attorneys

United States Patent Office

Re. 26,731
Reissued Dec. 2, 1969

26,731
BELTING

Peter Michael Robinson, Sutton Coldfield, England, assignor to The Dunlop Company Limited, London, England, a British company Original No. 3,297,513, dated Jan. 10, 1967, Ser. No. 124,038, July 14, 1961. Application for reissue Apr. 5, 1968, Ser. No. 724,676
Claims priority, application Great Britain, July 29, 1960, 26,413/60
Int. Cl. B32b 5/12
U.S. Cl. 161—57 6 Claims

Matter enclosed in heavy brackets [ ] appears in the original patent but forms no part of this reissue specification; matter printed in italics indicates the additions made by reissue.

*ABSTRACT OF THE DISCLOSURE*

*Conveyor belting suitable for passenger carrying even when supported at the edges only is disclosed, wherein a flexible plastic material has a composite reinforcement embedded therein. The reinforcement is formed of at least two parallel layers of flexible metal cords which extend transversely across the belt and at least one layer of a woven fabric which extends between the metal cord layers. The metal cords of each layer are equally spaced and parallel to adjacent cords and extend continuously along the length of the belting.*

This invention relates to conveyor belting suitable for use in passenger-carrying conveyor installations.

According to the invention conveyor belting comprises a flexible plastic material having embedded therein a composite reinforcement comprising a textile reinforcement together with at least two layers of metal cords, the metal cords in each layer lying substantially parallel with each other and substantially at right angles to the length of the belting, and a textile constituent of the composite reinforcement being disposed between each metal cord layer and the adjoining metal cord layer. Usually the metal cords are of steel.

Two steel cord layers may be employed, with a single and separate layer of textile reinforcement between them, embedded in flexible plastic material such as vulcanised natural or synthetic rubber, or synthetic resin. Alternatively, a more complex reinforcement may be used, consisting for example of three layers of steel cords and two distinct layers of textile reinforcement, the steel cord and textile layers alternating with each other. A composite reinforcement which is in the nature of a compound or solid woven fabric in which part or all of the weft material is constituted by the metal cords may also be used, rather than a composite structure comprising alternating but distinct textile and wire components; specific examples of these compound or solid woven fabrics are (1) a fabric comprising two steel cord wefts and between them a weft of textile material, all three being woven with textile warps into a unitary structure, and (2) a fabric comprising two steel cord wefts woven together with a binder of textile material and also woven each with its own filter of textile material.

A wide variety of textile reinforcements may be used, and textile constituents in belting according to the present invention may comprise, for instance, one or more plies of a woven or non-woven cotton, rayon, nylon or polyester fabric.

Specific examples of textile reinforcements according to the invention which may be used in the construction of covneyor belting will now be described with reference to the accompanying drawings in which.

Figure 1:
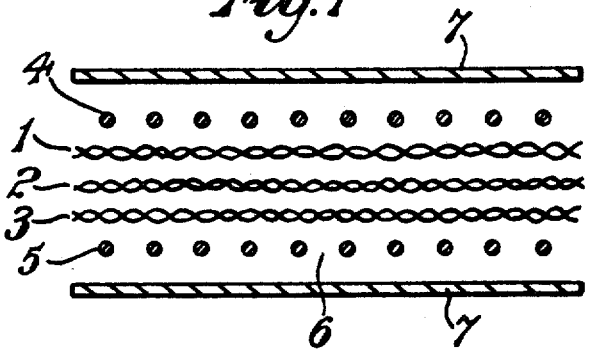
FIGURE 1 shows diagrammatically a section of belting containing three plies of woven cotton fabric used between two transverse layers of steel cord.

Referring to the drawings:

FIGURE 1 shows three plies 1, 2, 3 of 54 ounce per square yard woven cotton fabric between two transverse layers 4 and 5 of steel cord. These plies are impregnated with the rubber or synthetic resin composition 6 and a rubber covering layer 7 applied to each side.

Figure 2:
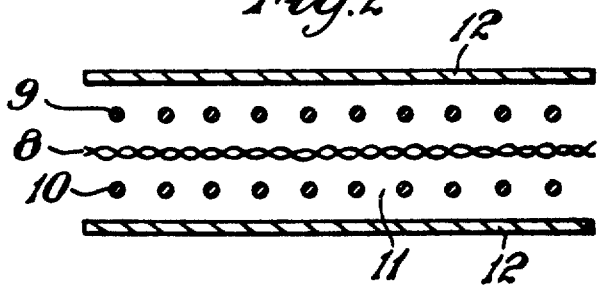
FIGURE 2 shows diagrammatically a section of belting containing a single ply of woven polyester fabric used between two transverse layers of steel cord.

FIGURE 2 shows a single ply 8 of 54 ounce per square yard woven polyester fabric used between two transverse layers 9 and 10 of steel cord and the whole impregnated with rubber composition 11 and a rubber covering layer 12 applied to each side of the belting.

Figure 3:
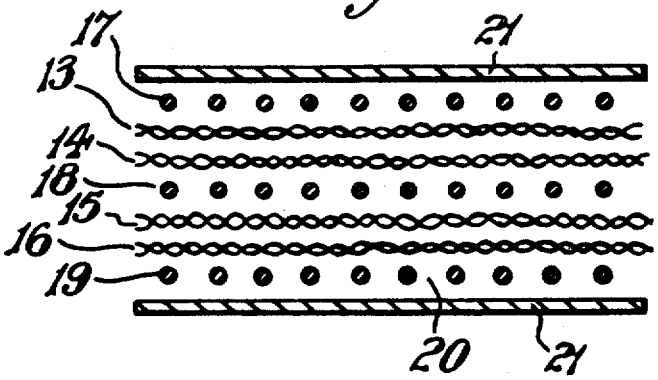
FIGURE 3 shows diagrammatically a section of belting containing four plies of woven polyester fabric used in conjunction with three transverse layers of steel cord, two of the polyester plies lying between each steel cord layer and the next.

FIGURE 3 shows four plies 13, 14, 15, 16 or 15 ounce per square yard woven polyester fabric used in conjunction with three transverse layers 17, 18, 19 of steel cord impregnated with a vulcanizable rubber composition 20 and a rubber covering layer 21 applied to each side.

Figure 4:
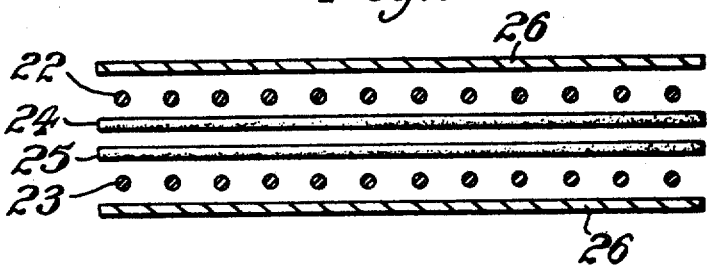
FIGURE 4 shows similarly a section of a belting containing two plies of a non-woven nylon fabric represented by two layers of longitudinal nylon cords used between two transverse layers of steel cord.

FIGURE 4 shows two transverse layers 22, 23 of steel cord separated by two layers 24, 25 of longitudinal nylon cord and a rubber covering layer 62 on each side of the belting.

Figure 5:
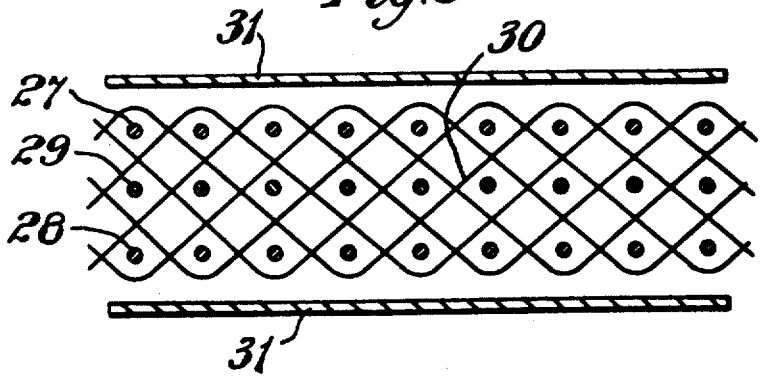
FIGURE 5 shows a section of a belting containing a textile warp, two transverse layers of steel cord separated by one layer of textile weft, all being woven with warps of a textile material into a unitary structure.

FIGURE 5 shows two transverse layers of steel cord 27, 28 separated by a textile weft 29 and woven with warps 30 of a textile material to form a unitary compound structure which is covered by outer layers 31 of rubber composition on each side.

Figure 6:
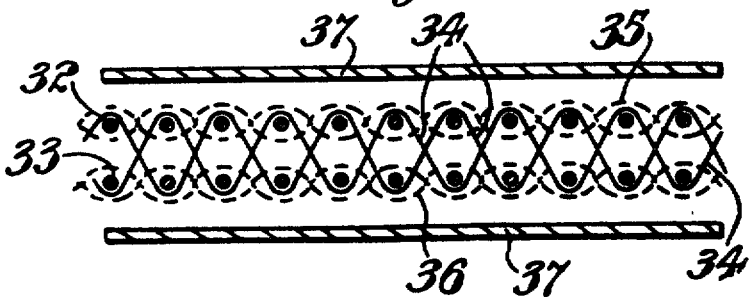
FIGURE 6 shows a section of a belting containing two steel cord wefts woven together with a binder of textile material and also woven each with its own filler of textile material.

FIGURE 6 shows two steel cord wefts 32, 33 woven together with textile cords 34 and each layer of steel cords woven with a filler 35, 36 of textile material, the whole impregnated and covered with a rubber composition 37.

The formulation adopted for the rubber or synthetic resin composition, and the method of manufacture, may correspond with those normally used in the rubber and synthetic resin belting art. Examples of the synthetic resin compositions which may be used are plasticized polyvinyl chloride compositions in which there are 50 to 150 parts of plasticizer, preferably 70 to 100 parts, per 100 parts of polyvinyl chloride; vinyl chloride copolymers, e.g., copolymers of vinyl chloride and vinyl acetate, are also suitable. In the finished product the vulcanized rubber composition or synthetic resin composition penetrates into the reinforcement layers, i.e., between their individual cords or threads. By using a thick layer of the flexible plastic between the transverse steel cord and the plies of fabric a substantially increased transverse rigidity is obtained without any appreciable increase in the longitudinal rigidity of the belting.

Steel cords may be suitably used in belting according to the present invention at spacings corresponding to about 10 cords per inch (measured along the length of the belting) e.g., 8 to 24 cords per inch. The individual cords may suitably be consitituted by a number of strands (e.g., 6 to 12 strands) of steel wire of a gauge which may for example be 30 to 44 Imperial Standard Wire Gauge.

Belting made according to the present invention has a relatively great rigidity in a transverse direction but has a relatively low rigidity in the longitudinal direction. This provides a very stable platform for passengers carried by the belting, so that the number of rollers needed to support the belting may be less than those employed in conventional passenger conveyors. The feature just mentioned also makes it possible to use rollers in the form of a disc or a ball, so that the belt is not supported across its full width but only at points across the width; thus the belt may even be supported by a line of discs at the edges only, so that there are no rollers below that part of the belt which actually supports the passengers. Nevertheless, the low longitudinal rigidity of belting according to the invention in the longitudinal direction minimises the power required to drive the belt and permits the use of small driving and tension pulleys.

Having now described my invention, what I claim is:

[1. Conveyor belting suitable for carrying human passengers which is flexible longitudinally and substantially rigid transversely and capable of providing a stable platform for the conveyance of passengers when supported at the edges only comprising a flexible plastic material having embedded therein a composite reinforcement comprising at least two transversely extending layers of metal cords arranged substantially continuously and uniformly along the length of the belting, the metal cords in each layer lying substantially parallel with each other and substantially at right angles to the length of the belting, and at least one layer of textile cords extending longitudinally of the belting between any two metal cord layers.]

2. Conveyor belting suitable for carrying human passengers which is flexible longitudinally and substantially rigid transversely and capable of providing a stable platform for the conveyance of passengers when supported at the edges only comprising a flexible plastic material having embedded therein a composite reinforcement comprising at least two transversely extending layers of metal cords constituted by 6–12 strands of steel wire of 30–44 Imperial Standard Wire Gauge arranged substantially continuously and uniformly along the length of the belting at a frequency of 8–24 cords per inch, the metal cords in each layer lying substantially parallel with each other and substantially at right angles to the length of the belting, and at least one layer of textile cords extending longitudinally of the belting between any two metal cord layers.

3. Conveyor belting according to claim [1] *2* wherein the composite reinforcement comprises two steel cord layers with a single and separate layer of textile between these two layers.

4. Conveyor belting according to claim [1] *2* having two transversely extending layers of metal cords.

5. Conveyor belting according to claim [1] *2* having at least two layers of textile cords between the layers of metal cords.

*6. Conveyor belting for carrying human passengers comprising a flexible plastic material having outer and inner surfaces and having embedded therein outer and inner layers of transversely extending, mutually parallel steel cords closely and uniformly spaced but individually enveloped by said plastic material, and a layer of textile cords intermediate said outer and inner layers of steel cords, the outer and inner layers of steel cords being parallel to the respective outer and inner surfaces of the belt, the cords of said layers being arranged so that the greatest distance in the longitudinal direction of the belting between successive steel cords in the same layer does not exceed .1122 inch, measured between the widest points of two adjacent cords, whereby the belting is rendered substantially rigid transversely thereof while longitudinal flexibility is preserved.*

*7. Conveyor belting for carrying human passengers comprising a flexible plastic material having embedded therein a composite reinforcement, said composite reinforcement including at least two layers of transversely extending individually flexible metal cords, and at least one layer of woven textile fabric extending throughout the length of the belting between two metal cord layers, each cord of said metal cord layers being equally spaced from the adjacent cords and the layers being arranged substantially continuously and uniformly along the length of the belting, the metal cords in each layer lying substantially parallel to one another and to the cords in any other layer, and substantially at right angles to the length of the belting, the composite reinforcement being bonded together by said plastic material, the cords of said layers being arranged so that the greatest distance in the longitudinal direction of the belting between successive metal cords in the same layer does not exceed .1122 inch, measured between the widest points of two adjacent cords, the belt structure being capable of providing a stable platform for the conveyance of passengers even when supported at its side edges only, while remaining flexible in the longitudinal direction.*

References Cited

The following references, cited by the Examiner, are of record in the patented file of this patent or the original patent.

UNITED STATES PATENTS

| | | | |
|---|---|---|---|
| 905,946 | 12/1908 | Stevenson | 139—412 XR |
| 2,425,575 | 8/1947 | Suloff. | |
| 2,511,581 | 6/1950 | Grigsby | 161—91 XR |
| 2,514,429 | 7/1950 | Waugh | 161—57 XR |
| 2,655,195 | 10/1953 | Curtis. | |
| 2,784,130 | 3/1957 | Kalin. | |
| 2,793,150 | 5/1957 | Deaves | 161—91 XR |
| 2,850,420 | 9/1958 | Hacker | 161—144 XR |
| 3,047,446 | 7/1962 | Henson | 161—78 XR |

FOREIGN PATENTS

| | | |
|---|---|---|
| 1,178,635 | 12/1958 | France. |
| 564,663 | 11/1932 | Germany. |
| 945,980 | 7/1956 | Germany. |
| 2,034 | 1859 | Great Britain. |
| 12,255 | 1914 | Great Britain. |
| 703,390 | 2/1954 | Great Britain. |
| 781,170 | 8/1957 | Great Britain. |
| 804,173 | 11/1958 | Great Britain. |

ROBERT F. BURNETT, Primary Examiner

U.S. Cl. X.R.

161—78, 96, 144; 198—193